(12) United States Patent
Zhao

(10) Patent No.: US 8,599,212 B2
(45) Date of Patent: Dec. 3, 2013

(54) CHARACTER DISPLAY METHOD AND APPARATUS

(71) Applicant: Huawei Device Co., Ltd., Guangdong (CN)

(72) Inventor: Dejie Zhao, Xi'an (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/718,034

(22) Filed: Dec. 18, 2012

(65) Prior Publication Data

US 2013/0106897 A1 May 2, 2013

Related U.S. Application Data

(63) Continuation of application No. PCT/CN2011/079732, filed on Sep. 16, 2011.

(51) Int. Cl.
| | |
|---|---|
| *G09G 5/00* | (2006.01) |
| *G09G 5/02* | (2006.01) |
| *H04N 11/00* | (2006.01) |
| *H04N 5/46* | (2006.01) |
| *H04N 1/46* | (2006.01) |
| *G03F 3/08* | (2006.01) |
| *G06K 9/00* | (2006.01) |
| *G06K 9/40* | (2006.01) |
| *G06K 9/36* | (2006.01) |

(52) U.S. Cl.
USPC ........... 345/589; 345/581; 345/606; 345/619; 345/654; 345/467; 345/552; 345/557; 345/563; 358/518; 358/525; 382/167; 382/254; 382/276; 382/300

(58) Field of Classification Search
USPC ................. 345/418, 581, 589–591, 593, 600, 345/618–619, 606, 643, 467–469.1, 501, 345/548–551, 204, 690; 358/518–520, 358/523–525, 448; 348/254, 552–553, 557, 348/560, 563–566, 569, 571, 582, 599, 603, 348/630, 708, 728, 739; 382/162, 167, 254, 382/274, 276, 300
See application file for complete search history.

(56) References Cited

U.S. PATENT DOCUMENTS 5,248,964 A * 9/1993 Edgard et al. ................ 345/634
6,809,741 B1 * 10/2004 Bates et al. ................... 345/597
(Continued)

FOREIGN PATENT DOCUMENTS

| CN | 1284813 A | 2/2001 |
|---|---|---|
| CN | 1674035 A | 9/2005 |

(Continued)

OTHER PUBLICATIONS

Communication from a foreign counterpart application, International Application No. PCT/CN2011/0079732, International Search Report dated Jun. 7, 2012, 3 pages.

(Continued)

*Primary Examiner* — Wesner Sajous
(74) *Attorney, Agent, or Firm* — Conley Rose, P.C.; Grant Rodolph; Rayhao Chung

(57) ABSTRACT

The present invention discloses a character display method and apparatus. The method includes: obtaining a display color value of a character; obtaining a background color value of the character according to a position of the character; obtaining a difference between the display color value and the background color value; obtaining an outline of the character when the difference is smaller than a preset threshold; and displaying the character that has the outline. By adopting the present invention, the character may be clearly displayed in a background without changing a color of the character and a color of the background.

17 Claims, 3 Drawing Sheets

(56) References Cited

U.S. PATENT DOCUMENTS

| | | | |
|---|---|---|---|
| 2005/0162426 A1* | 7/2005 | Okada | 345/467 |
| 2005/0207647 A1 | 9/2005 | Maeda | |
| 2006/0232587 A1* | 10/2006 | Oh | 345/467 |
| 2007/0177795 A1 | 8/2007 | Arneau et al. | |
| 2008/0273799 A1 | 11/2008 | Kimura | |
| 2012/0154420 A1* | 6/2012 | Calandrino et al. | 345/589 |

FOREIGN PATENT DOCUMENTS

| | | | |
|---|---|---|---|
| CN | 1848929 A | 10/2006 | |
| EP | 1713033 A2 | 10/2006 | |
| JP | 2008199366 A | 8/2008 | |

OTHER PUBLICATIONS

Communication from a foreign counterpart application, International Application No. PCT/CN2011/0079732, Partial English Translation, International Search Report dated Jun. 7, 2012, 2 pages.

Foreign Communication From a Counterpart Application, Chinese Application No. 201180002738.6, Chinese Office Action dated May 20, 2013, 5 pages.

Foreign Communication From a Counterpart Application, Chinese Application No. 201180002738.6, Partial English Translation of Chinese Office Action dated May 20, 2013, 7 pages.

Foreign Communication From a Counterpart Application, European Application No. 11795216.8, Extended European Search Report dated May 7, 2013, 6 pages.

* cited by examiner

CHARACTER DISPLAY METHOD AND APPARATUS

CROSS-REFERENCE TO RELATED APPLICATION

This application is a continuation of International Application No. PCT/CN2011/079732, filed on Sep. 16, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of information display, and in particular, to a character display method and apparatus.

BACKGROUND

Generally, various existing display terminal devices have a character display function, and with the development of device performance and a requirement for display aesthetics, not only a character, but also different backgrounds are displayed when the character is displayed. If a character color approximates a background color, a character display effect is influenced, and a viewer cannot see the character clearly. For example, the foregoing problem often occurs in a mobile terminal, a computer display, and a mobile television (TV) on public transportation; as a result, some displayed characters cannot be recognized, severely influencing a visual effect.

In the prior art, there are mainly two manners to solve the foregoing problem: one is to change the background color, and the other is to change a font color. However, an obvious deficiency exists in both manners: If the background color is changed, an overall interface effect is changed, and a side effect is very obvious; moreover, some backgrounds have various different colors, and when a color range is too wide, it indicates that whatever the font color is, some characters may not be significantly distinguished from their backgrounds thereof, which severely limits use of these backgrounds. If the font color is changed, and the font color is darkened, lightened, or even changed into other colors according to comparison between each font color and the background color, that the font of different colors appears in a same line of characters or in a same area of text may occur, which makes the visual effect messy.

SUMMARY

Embodiments of the present invention provide a character display method and apparatus, which may enable a character to be clearly displayed in a background without changing a color of the character and a color of the background.

A character display method in an embodiment of the present invention includes: obtaining a display color value of a character; obtaining a background color value of the character according to a position of the character; obtaining a difference between the display color value and the background color value; obtaining an outline of the character when the difference is smaller than a preset threshold; and displaying the character that has the outline.

A character display apparatus in an embodiment of the present invention includes: a color value obtaining unit configured to obtain a display color value of a character; a difference obtaining unit configured to obtain a background color value of the character according to a position of the character and obtain a difference between the display color value and the background color value; and a display unit configured to obtain an outline of the character when the difference is smaller than a preset threshold and display the character that has the outline.

A terminal display device in an embodiment of the present invention includes the foregoing character display apparatus.

In the embodiments of the present invention, the purpose for distinguishing the character from the background is achieved by outlining the character; moreover, only those characters, character colors of which excessively approximate to the background color, are outlined, which does not ruin an overall display effect.

BRIEF DESCRIPTION OF THE DRAWINGS

To illustrate the technical solutions in the embodiments of the present invention or in the prior art more clearly, the following briefly describes accompanying drawings needed for describing the embodiments or the prior art. Obviously, the accompanying drawings in the following description are merely some embodiments of the present invention, and persons of ordinary skill in the art may obtain other drawings from the accompanying drawings without making creative efforts.

DETAILED DESCRIPTION

In the embodiments of the present invention, a character can be distinguished from the background by outlining the character, thereby improving a display effect of the character.

Figure 1:
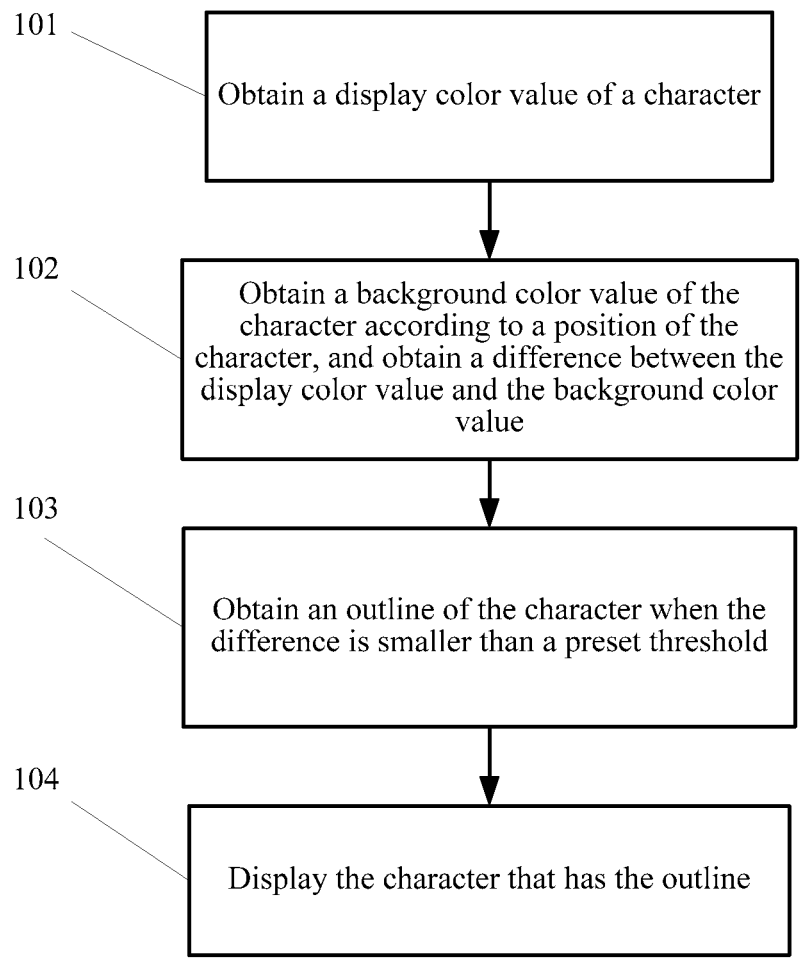
FIG. 1 is a specific schematic flow chart of a character display method according to an embodiment of the present invention.

FIG. 1 shows a specific schematic flow chart of a character display method according to an embodiment of the present invention. The method includes the following process.

101: Obtain a display color value of a character; for example, when the character is displayed by adopting red-green-blue (RGB) three-primary colors, a display color value of a certain character may be obtained as $(R_0, G_0, B_0)$.

102: Obtain a background color value of the character according to a position of the character, and obtain a difference between the display color value and the background color value.

Generally, when character input is performed, a display position, a character font, and a character size of a certain character are recorded in a character input apparatus. The position and a background range of the character may be located according to the information. For example, for a terminal device using a high-pass binary runtime environment for wireless (BREW) platform, a background color of each character may be obtained through an IWIDGET_Get-BGColor( ) interface provided by the platform. Likewise, the platform also provides another interface for obtaining information such as a color of a current character.

When the background color value of the character is obtained, a certain number of background points may be extracted from the background range; color values of these background points are used as background color values; and a color value of each background point is compared with the display color value of the character to obtain the corresponding difference. The difference may be a standard difference, may also be an absolute difference, and so on.

Positions and the number of the extracted background points in the background range may be determined according to a practical need. For example, it may be determined that the background points are five points at the top, at the bottom, on the left, on the right, and at the center of the background at the position of the character. If a manner of the standard difference is adopted, the difference between the display color value and a color value of one background point is:

$$\Delta_i = ((R_i - R_0)^2 + (G_i - G_0)^2 + (B_i - B_0)^2)^{1/2},$$

where $R_0$, $G_0$, and $B_0$ are display color values of the character; $R_i$, $G_i$, and $B_i$ are background color values of a background point i; and $\Delta_i$ is a difference between the color value of the character and the color value of the background point i.

Figure 2:
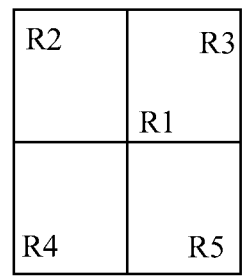
FIG. 2 is a specific schematic diagram of a background point in a background range of a character according to an embodiment of the present invention.

If only one background point is extracted, the foregoing standard difference between the point and the character is used as the difference between the character color and the background color. If multiple background points, such as five points shown in FIG. 2, are extracted, the big box in FIG. 2 denotes a background range of the position of the character. The color values of each point are denoted as (R1, G1, B1), (R2, G2, B2), (R3, G3, B3), (R4, G4, B4), and (R5, G5, B5). Then, standard differences of the points are calculated as follows:

$$\Delta_1 = ((R_1 - R_0)^2 + (G_1 - G_0)^2 + (B_1 - B_0)^2)^{1/2};$$

$$\Delta_2 = ((R_2 - R_0)^2 + (G_2 - G_0)^2 + (B_2 - B_0)^2)^{1/2};$$

$$\Delta_3 = ((R_3 - R_0)^2 + (G_3 - G_0)^2 + (B_3 - B_0)^2)^{1/2};$$

$$\Delta_4 = ((R_4 - R_0)^2 + (G_4 - G_0)^2 + (B_4 - B_0)^2)^{1/2};$$

$$\Delta_5 = ((R_5 - R_0)^2 + (G_5 - G_0)^2 + (B_5 - B_0)^2)^{1/2}.$$

Moreover, a difference between the display color value and the background color value, which is the minimum in the foregoing differences, is selected, that is:

$$\Delta = \min(\Delta_1, \Delta_2, \Delta_3, \Delta_4, \Delta_5).$$

Definitely, the whole background may be pre-partitioned according to its color change, and one color value is used to represent a color value of the area. As long as a partition where the character locates is determined, the background color value of the character may be determined as the color value representing the partition. If part of the character is in the partition, a partition where a maximum area of the character locates is used as a partition where the character locates. Likewise, the difference may be a standard difference, may also be an absolute difference, and so on.

103: Obtain an outline of the character when the difference is smaller than a preset threshold, where the threshold may be pre-selected according to an actual effect, and the threshold may be adjusted according to performance of difference terminal display screens.

To ensure that a display effect is not messy, a fixed value may be selected for a color of the outline, such as black or white. When an interface is called to display the character, some attributes (e.g., outline width, the outline color and the like) of the outline are transmitted to an interface for outlining, and the interface informs an outlining execution entity of the attributes. Then, the entity completes the outlining of the character.

104: Display the character that has the outline, where if, in step 103, the difference is greater than or equal to the threshold, the character is not outlined, but is directly displayed.

Figure 3:
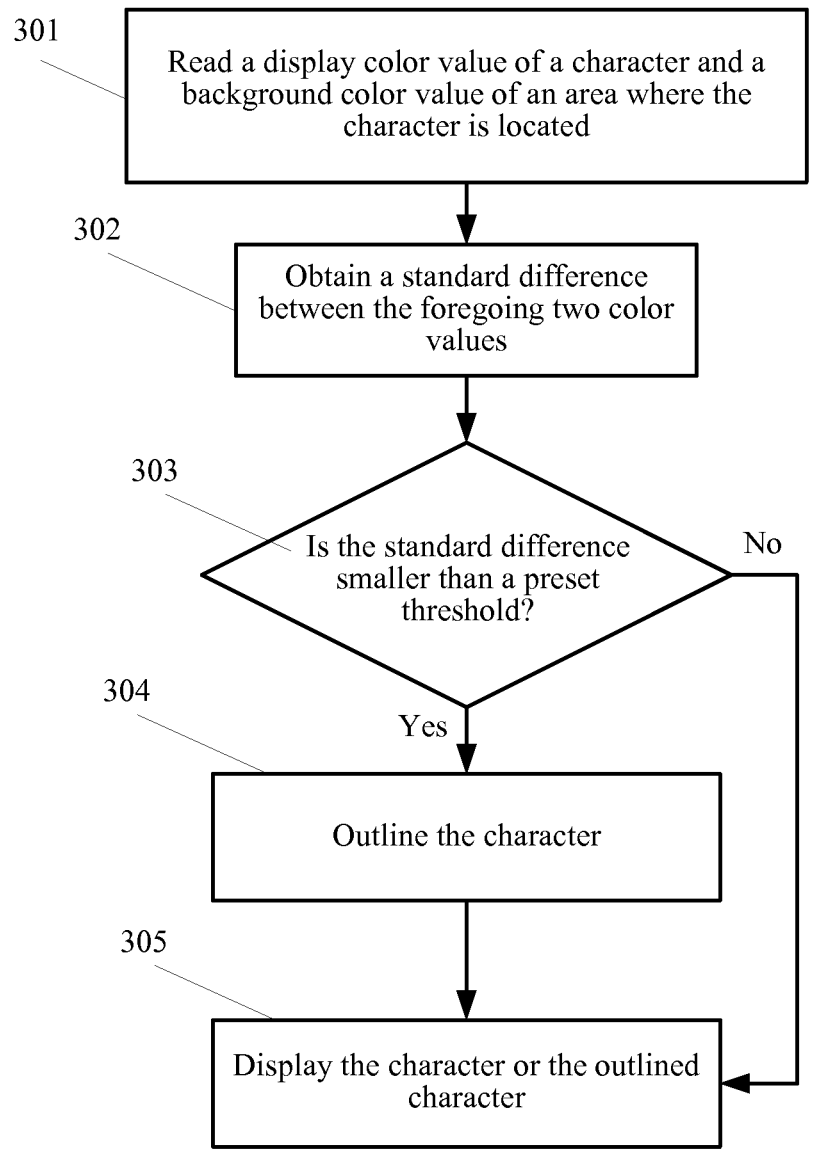
FIG. 3 is anther specific schematic flow chart of a character display method according to an embodiment of the present invention.

FIG. 3 shows a character display method when a difference is calculated by means of a standard difference according to an embodiment of the present invention. The method includes the following steps.

301: Read a display color value of a character and a background color value of an area where the character is located.

302: Obtain a standard difference between the foregoing two color values.

303: Compare the standard difference and a preset threshold to determine whether the standard difference is smaller than the preset threshold; if a comparison result is yes, turn to step 304; and if a comparison result is no, turn to step 305.

304: Outline the character.

305: Display the character or the outlined character.

In the embodiment of the present invention, the purpose for distinguishing the character from a background is achieved by outlining the character; moreover, only those characters, character colors of which excessively approximate to a background color, are outlined, which does not ruin an overall display effect.

Accordingly, an embodiment of the present invention further provides a character display apparatus, and the display apparatus may be a part of a terminal display device, where the terminal display device may be a mobile communication terminal, a mobile TV, a personal computer, and the like.

Figure 4:
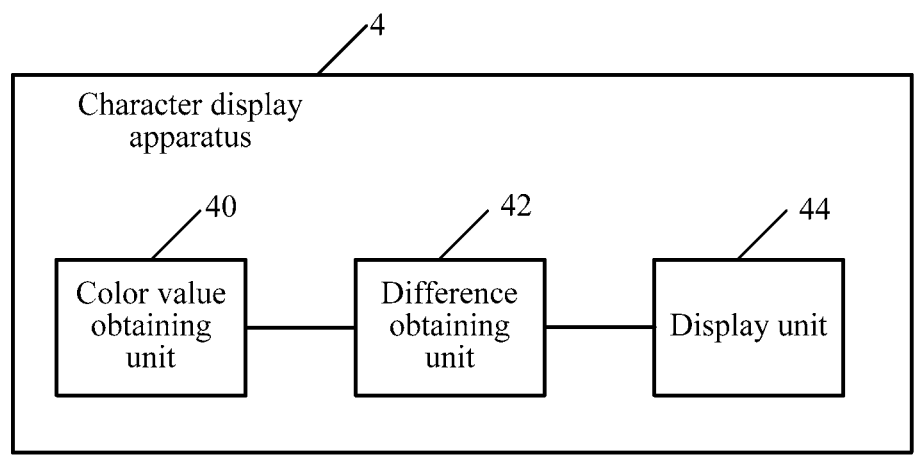
FIG. 4 is a specific schematic composition diagram of a character display apparatus according to an embodiment of the present invention.

FIG. 4 shows a specific schematic composition diagram of the character display apparatus in the embodiment of the present invention. The apparatus 4 includes: a color value obtaining unit 40 configured to obtain a display color value of a character; a difference obtaining unit 42 configured to obtain a background color value of the character according to a position of the character, and obtain a difference between the display color value and the background color value; and a display unit 44 configured to obtain an outline of the character when the difference is smaller than a preset threshold, and display the character that has the outline.

The difference obtaining unit 42 may obtain the difference according to a color value of a background point and may also obtain the difference according to a representative color value of a block of a background. A specific obtaining manner is consistent with that in the foregoing method embodiment, which is not repeatedly described here.

Figure 5:
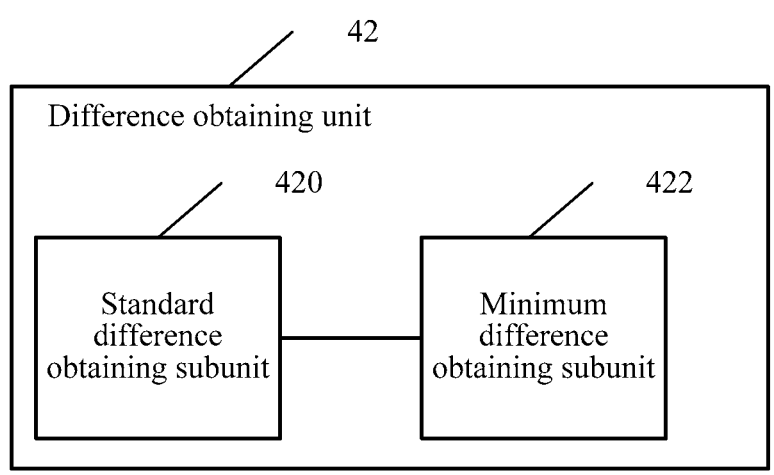
FIG. 5 is a specific schematic composition diagram of a difference obtaining unit according to an embodiment of the present invention.

As shown in FIG. 5, the difference obtaining unit 42 may include: a standard difference obtaining subunit 420 configured to obtain color values of multiple background points of the character according to the position of the character, and obtain a standard difference between the display color value and a color value of each background point; and a minimum difference obtaining subunit 422 configured to obtain a minimum standard difference in the standard difference. Accordingly, the display unit 44 is further configured to obtain the outline of the character when the minimum standard difference is smaller than the preset threshold and display the character that has the outline.

The foregoing background points are five points at the top, at the bottom, on the left, on the right, and at the center of the background at the position of the character. When the display color value and the color value of the background point are RGB values, the difference obtaining unit 32 is further configured to obtain a difference between the display color value and a color value of one background point according to the following formula:

$$\Delta_i=((R_i-R_0)^2+(G_i-G_0)^2+(B_i-B_0)^2)^{1/2},$$

where $R_0$, $G_0$, and $B_0$ are display color values of the character; $R_i$, $G_i$, and $B_i$, are background color values of a background point i; and $\Delta_i$ is a difference between the color value of the character and the color value of the background point i.

In the embodiment of the present invention, the purpose for distinguishing the character from the background is achieved by outlining the character; moreover, only those characters, character colors of which excessively approximate to the background color, is outlined, which does not ruin an overall display effect.

The foregoing describes exemplary embodiments of the present invention. It should be noted that persons of ordinary skill in the art may further make various improvements and modifications without departing from the principle of the present invention, and such improvements and modifications shall fall within the protection scope of the present invention.

What is claimed is:

1. A method for displaying a character produced by an electronic device that comprises a display, wherein the method is executed by the electronic device, comprising:
   obtaining a display color value of a character;
   obtaining a background color value of the character according to a position of the character;
   obtaining a difference between the display color value and the background color value;
   obtaining an outline of the character when the difference is smaller than a preset threshold; and
   displaying the character that has the outline on the display;
   wherein obtaining the background color value of the character according to the position of the character comprises obtaining color values of multiple background points of the character according to the position of the character, and
   wherein obtaining the difference between the display color value and the background color value comprises:
      obtaining a standard difference between the display color value and a color value of each of the multiple background points; and
      obtaining a minimum standard difference in the standard difference.

2. The method according to claim 1, wherein the display color value and the color value of the background point comprise red-green-blue (RGB) values, and wherein the difference between the display color value and a color value of a background point is calculated using an equation:

$$\Delta_i=((R_i-R_0)^2+(G_i-G_0)^2+(B_i-B_0)^2)^{1/2},$$

wherein $R_0$, $G_0$, and $B_0$ are display color values of the character,
wherein $R_i$, $G_i$, and $B_i$ are background color values of a background point i, and
wherein $\Delta_i$ is a difference between the color value of the character and the color value of the background point i.

3. The method according to claim 1, wherein obtaining the outline of the character when the difference is smaller than the preset threshold comprises obtaining the outline of the character when the minimum standard difference is smaller than the preset threshold.

4. The method according to claim 3, wherein the background comprises a top, a bottom, a left, a right, and a center, and wherein the multiple background points comprise points at the top, at the bottom, on the left, on the right, and at the center of the background at the position of the character.

5. The method according to claim 4, wherein the display color value and the color value of the background point comprise RGB values, and wherein the difference between the display color value and a color value of a background point is calculated using an equation:

$$\Delta_i=((R_i-R_0)^2+(G_i-G_0)^2+(B_i-B_0)^2)^{1/2},$$

wherein $R_0$, $G_0$, and $B_0$, are display color values of the character,
wherein $R_i$, $G_i$, and $B_i$, are background color values of a background point i, and
wherein $\Delta_i$ is a difference between the color value of the character and the color value of the background point i.

6. The method according to claim 3, wherein the display color value and the color value of the background point comprise RGB values, and wherein the difference between the display color value and a color value of a background point is calculated using an equation:

$$\Delta_i=((R_i-R_0)^2+(G_i-G_0)^2+(B_i-B_0)^2)^{1/2},$$

wherein $R_0$, $G_0$, and $B_0$ are display color values of the character,
wherein $R_i$, $G_i$, and $B_i$ are background color values of a background point i, and
wherein $\Delta_i$ is a difference between the color value of the character and the color value of the background point i.

7. A character display apparatus comprising:
   a color value obtaining unit configured to obtain a display color value of a character;
   a difference obtaining unit configured to obtain a background color value of the character according to a position of the character and obtain a difference between the display color value and the background color value; and
   a display unit configured to obtain an outline of the character when the difference is smaller than a preset threshold and display the character that has the outline,
   wherein the difference obtaining unit comprises:
      a standard difference obtaining subunit configured to obtain color values of multiple background points of the character according to the position of the character and obtain a standard difference between the display color value and a color value of each background point; and
      a minimum difference obtaining subunit configured to obtain a minimum standard difference in the standard difference, and
   wherein the display unit is further configured to obtain the outline of the character when the minimum standard difference is smaller than the preset threshold and display the character that has the outline.

8. The apparatus according to claim 7, wherein the apparatus is incorporated in a terminal display device.

9. The apparatus according to claim 7, wherein the display color value and the color value of the background point comprise RGB values, and wherein the difference obtaining unit is further configured to obtain the difference between the display color value and a color value of a background point according to the following formula:

$$\Delta_i = ((R_i-R_0)^2+(G_i-G_0)^2+(B_i-B_0)^2)^{1/2},$$

wherein $R_0$, $G_0$, and $B_0$ are display color values of the character, wherein $R_i$, $G_i$, and $B_i$ are background color values of a background point i, and wherein $\Delta_i$ a difference between the color value of the character and the color value of the background point i.

10. The apparatus according to claim 9, wherein the apparatus is incorporated in a terminal display device.

11. The apparatus according to claim 7, wherein the apparatus is incorporated in a terminal display.

12. The apparatus according to claim 7, wherein the display color value and the color value of the background point comprise RGB values, and wherein the difference obtaining unit is further configured to obtain the difference between the display color value and a color value of a background point according to the following formula:

$$\Delta_i = ((R_i-R_0)^2+(G_i-G_0)^2+(B_i-B_0)^2)^{1/2},$$

wherein $R_0$, $G_0$, and $B_0$ are display color values of the character;

wherein $R_i$, $G_i$, and $B_i$ are background color values of a background point i, and wherein $\Delta_i$ is a difference between the color value of the character and the color value of the background point i.

13. The apparatus according to claim 12, wherein the apparatus is incorporated in a terminal display.

14. The apparatus according to claim 7, wherein the background comprises a top, a bottom, a left, a right, and a center, and wherein the multiple background points comprise points at the top, at the bottom, on the left, on the right, and at the center of the background at the position of the character.

15. The apparatus according to claim 14, wherein the apparatus is incorporated in a terminal display.

16. The apparatus according to claim 14, wherein the display color value and the color value of the background point comprise RGB values, and wherein the difference obtaining unit is further configured to obtain the difference between the display color value and a color value of a background point according to the following formula:

$$\Delta_i = ((R_i-R_0)^2+(G_i-G_0)^2+(B_i-B_0)^2)^{1/2},$$

wherein $R_0$, $G_0$, and $B_0$ are display color values of the character, wherein $R_i$, $G_i$, and $B_i$ are background color values of a background point i, and wherein $\Delta_i$ is a difference between the color value of the character and the color value of the background point i.

17. The apparatus according to claim 16, wherein the apparatus is incorporated in a terminal display device.

* * * * *

UNITED STATES PATENT AND TRADEMARK OFFICE
CERTIFICATE OF CORRECTION

PATENT NO. : 8,599,212 B2
APPLICATION NO. : 13/718034
DATED : December 3, 2013
INVENTOR(S) : Dejle Zhao Page 1 of 1

It is certified that error appears in the above-identified patent and that said Letters Patent is hereby corrected as shown below:

Title Page, Item (71) Applicant should read: "Huawei Device Co., Ltd., Shenzhen (CN)"

In the Claims:

Column 5/Line 42 should read: "displaying the character that has the outline on the display,"

Column 7/Line 8 should read: "wherein $\Delta_i$ is a difference between the color value of the"

Column 7/Line 14 should read: "ratus is incorporated in a terminal display device."

Column 8/Line 2 should read: "ratus is incorporated in a terminal display device."

Column 8/Line 9 should read: "ratus is incorporated in a terminal display device."

Signed and Sealed this
Fifteenth Day of April, 2014

Michelle K. Lee
*Deputy Director of the United States Patent and Trademark Office*